US012587554B2

(12) United States Patent
Sharma et al.

(10) Patent No.: US 12,587,554 B2
(45) Date of Patent: Mar. 24, 2026

(54) SYSTEM AND METHOD FOR DETECTING AND PREVENTING MODEL INVERSION ATTACKS

(71) Applicant: Microsoft Technology Licensing, LLC, Redmond, WA (US)

(72) Inventors: Dushyant Sharma, Mountain House, CA (US); Patrick Aubrey Naylor, Reading (GB); William Francis Ganong, III, Brookline, MA (US); Uwe Helmut Jost, Groton, MA (US); Ljubomir Milanovic, Vienna (AT)

(73) Assignee: Microsoft Technology Licensing, LLC., Redmond, WA (US)

( * ) Notice: Subject to any disclaimer, the term of this patent is extended or adjusted under 35 U.S.C. 154(b) by 353 days.

(21) Appl. No.: 18/146,620

(22) Filed: Dec. 27, 2022

(65) Prior Publication Data

US 2024/0214404 A1    Jun. 27, 2024

(51) Int. Cl.
*G06F 15/16* (2006.01)
*H04L 9/40* (2022.01)

(52) U.S. Cl.
CPC ...... *H04L 63/1425* (2013.01); *H04L 63/1491* (2013.01)

(58) Field of Classification Search
CPC ........................ H04L 63/1425; H04L 63/1491
See application file for complete search history.

(56) References Cited

U.S. PATENT DOCUMENTS

| | | | | |
|---|---|---|---|---|
| 2020/0005133 A1* | 1/2020 | Zhang | | G06N 3/045 |
| 2020/0019699 A1* | 1/2020 | Araujo | | G06N 3/045 |
| 2020/0134180 A1* | 4/2020 | Lal | | G06N 5/04 |
| 2020/0274894 A1* | 8/2020 | Argoeti | | H04L 63/1433 |
| 2021/0157912 A1 | 5/2021 | Kruthiveti Subrahmanyeswara Sai | | |
| 2022/0256303 A1* | 8/2022 | Sharma | | G01S 5/18 |
| 2023/0114598 A1* | 4/2023 | Schunter | | G06F 21/53 726/22 |

OTHER PUBLICATIONS

International Search Report and Written Opinion received for PCT Application No. PCT/US2023/083467, Apr. 5, 2024, 11 pages.
International Preliminary Report on Patentability received for PCT Application No. PCT/US2023/083467, Jul. 10, 2025, 06 pages.

* cited by examiner

*Primary Examiner* — Normin Abedin
(74) *Attorney, Agent, or Firm* — Foley IP Law, PLLC

(57) ABSTRACT

A method, computer program product, and computing system for executing a plurality of requests to process data using a trained machine learning model. An anomalous pattern of requests including at least a threshold amount of out-of-domain data is identified from the plurality of requests. A potential model inversion attack is detected based upon, at least in part, identifying the anomalous pattern of requests.

20 Claims, 7 Drawing Sheets

10 executing a plurality of requests to process data using a trained machine learning model

200 identifying an anomalous pattern of requests from the plurality of requests including at least a threshold amount of out-of-domain data

202 comparing the anomalous pattern of requests to training data associated with the trained machine learning model

208 detecting a potential model inversion attack based upon, at least in part, identifying the anomalous pattern of requests

204 executing a plurality of subsequent requests to process data using the trained machine learning model on a decoy machine learning model

218 monitoring for convergence in the plurality of requests and training data associated with the decoy machine learning model

Figure 2:
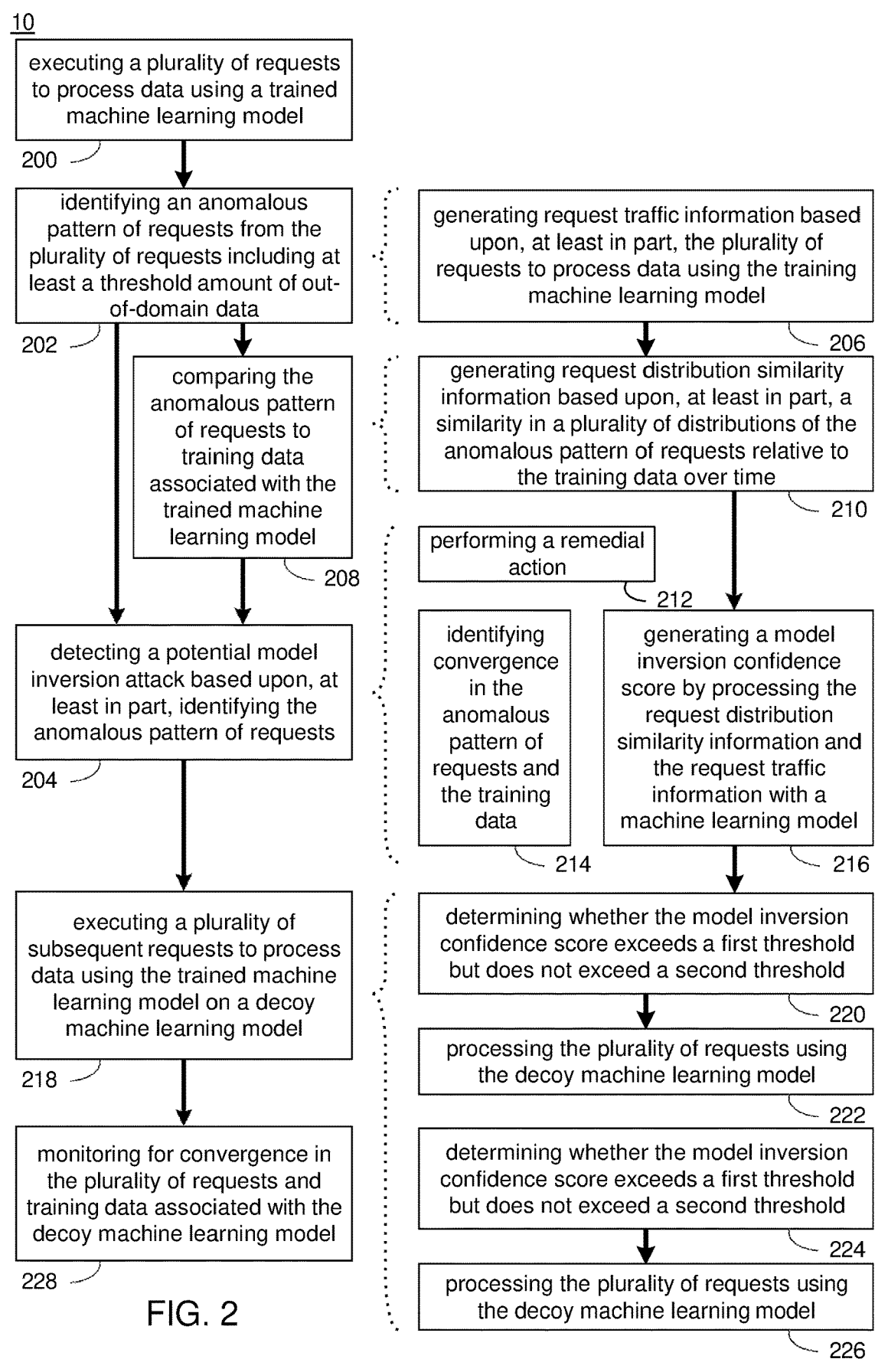

228

FIG. 2 generating request traffic information based upon, at least in part, the plurality of requests to process data using the training machine learning model

206 generating request distribution similarity information based upon, at least in part, a similarity in a plurality of distributions of the anomalous pattern of requests relative to the training data over time

210 performing a remedial action

212 identifying convergence in the anomalous pattern of requests and the training data

214 generating a model inversion confidence score by processing the request distribution similarity information and the request traffic information with a machine learning model

216 determining whether the model inversion confidence score exceeds a first threshold but does not exceed a second threshold

220 processing the plurality of requests using the decoy machine learning model

222 determining whether the model inversion confidence score exceeds a first threshold but does not exceed a second threshold

224 processing the plurality of requests using the decoy machine learning model

SYSTEM AND METHOD FOR DETECTING AND PREVENTING MODEL INVERSION ATTACKS

BACKGROUND

Machine learning models are effective at processing significant quantities of data and recognizing patterns within the data for particular purposes. However, machine learning models must be trained to identify these patterns. As such, the effectiveness and functionality of a machine learning model is largely dependent upon the quality of the training data. Accordingly, securing training data is an important aspect of machine learning model generation and maintenance.

For example, model inversion is a type of attack whereby an entity abuses access to a trained machine learning model in order to obtain the original training data. For example, this may be achieved using Generative Adversarial Networks (GANs) that are used to guide the training of a generator to reconstruct the distribution of the original training data of the target machine learning model (the "Model Under Attack (MUA)"). However, there are various ways that a bad actor may abuse access to a trained machine learning model to generate a copy of the training data distribution. The bad actor may then use this data to train their own machine learning model which they can market and sell as their proprietary system.

BRIEF DESCRIPTION OF THE DRAWINGS

FIG. 2 is a flow chart of one implementation of the model inversion detection process;

FIGS. 3-6 are diagrammatic views of the model inversion detection process.

Like reference symbols in the various drawings indicate like elements.

DETAILED DESCRIPTION OF THE PREFERRED EMBODIMENTS

Figure 1:
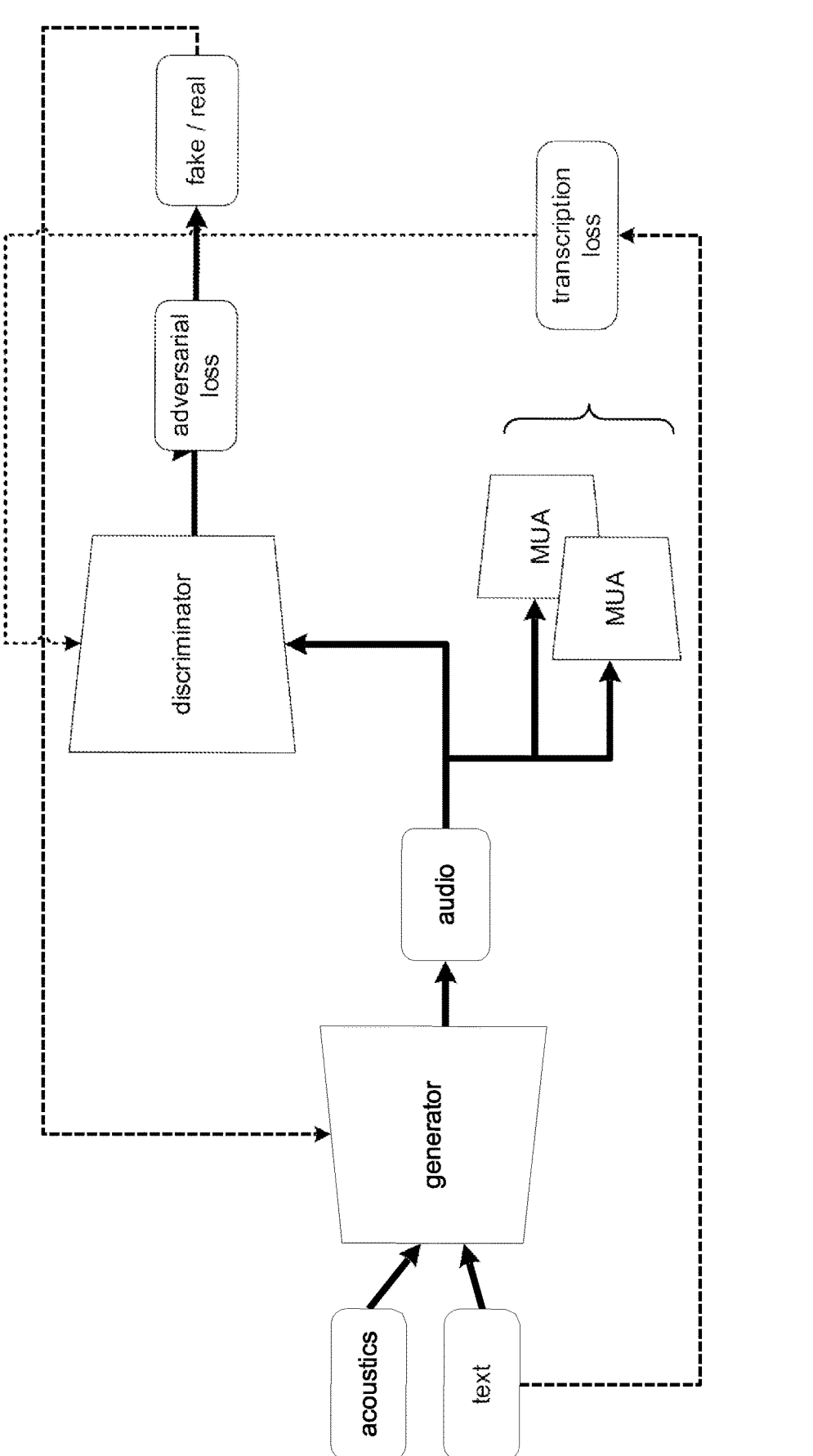
FIG. 1 is a diagrammatic view of a model inversion attack according to one or more implementations of the present disclosure.

As will be discussed in greater detail below, implementations of the present disclosure detect and prevent model inversion attacks on a trained machine learning model. For example, a registered user of a trained machine learning model (e.g., a trained machine learning model of a speech processing system) may abuse access to the trained machine learning model to infer the training data distribution. This bad actor may use the inferred training data distribution to subsequently train their own competing machine learning model. The bad actor may also be able to recover sensitive content (e.g., private health information/personally identifiable information) if that information is present in the trained machine learning model. In another example, the bad actor may abuse access to a trained machine learning model to label the bad actor's training data. Each of these examples represents a serious security threat.

To address these vulnerabilities, implementations of the present disclosure detect and prevent model inversion attacks by analyzing incoming data for anomalous patterns (e.g., anomalous traffic patterns and distribution similarity over time in multiple requests for requests that include at least a threshold amount of out-of-domain data). Out-of-domain data is data that does not match the domain of the trained machine learning model or the domain of the data the trained machine learning model typically processes. Once a potential model inversion attack is detected, a remedial action is performed to prevent the model inversion attack (e.g., executing subsequent requests for processing data using the trained machine learning model with a decoy machine learning model; blocking incoming requests from the particular actor; and/or slowing requests from the particular actor).

The details of one or more implementations are set forth in the accompanying drawings and the description below. Other features and advantages will become apparent from the description, the drawings, and the claims.

The Model Inversion Detection Process:

As discussed above, machine learning models are effective at processing significant quantities of data and recognizing patterns within the data for particular purposes. However, machine learning models must be trained to identify these patterns. As such, the effectiveness and functionality of a machine learning model is largely dependent upon how representative the training data is for a particular domain. For example, in the context of a speech processing machine learning model, the effectiveness of the machine learning model is determined by how well the training data represents the particular acoustic environment (e.g., location where the speech data is obtained). In some implementations, the effectiveness of the machine learning model is dependent upon the accuracy of the labelling of the training data. In this manner, higher accuracy in the labeling of the training data results in higher accuracy in the machine learning model performance. Accordingly, securing training data is an important aspect of machine learning model generation and maintenance.

Implementations of the present disclosure may detect and prevent a model inversion attack from being executed on a trained machine learning model. A machine learning system or model is a software component that is trained to recognize certain types of patterns from input data. For example, machine learning models are generally trained with particular approaches or algorithms divided into various categories depending on the nature of the signals available: supervised learning, unsupervised learning, semi-supervised learning, and reinforcement learning. Supervised learning includes presenting a computing device with example inputs and their desired outputs, where the goal is to learn a general rule that maps inputs to outputs. Semi-supervised learning is similar to supervised learning by presenting the computing device with a small number of labeled examples and a large number of unlabeled examples. With unsupervised learning, no labels are given to the learning algorithm, leaving it on its own to find structure in its input. Unsupervised learning can be a goal in itself (discovering hidden patterns in data) or a means towards an end (feature learning). Reinforcement learning generally includes a computing device interacting in a dynamic environment in which it must perform a certain goal (such as driving a vehicle or playing a game against an opponent). As it navigates its problem space, the program is provided feedback that's analogous to rewards, which it tries to maximize. While three examples of machine learning approaches have been provided, it will be appreciated that other machine learning models are possible within the scope of the present disclosure.

As discussed above, training data is an important component in the development and maintenance of a machine learning model. Training data is a dataset that is used to train a machine learning model to extract or identify features that are relevant to specific goals. For supervised machine learning models, the training data is labeled. For unsupervised machine learning models, the training data is not labeled. The accuracy of a machine learning model in identifying patterns is dependent upon the training data used to train the machine learning model.

For example, the overall efficiency of a speech processing machine learning model (e.g., an automated speech recognition (ASR) system) to recognize and appropriately process speech (e.g., convert speech to text in ASR) is based upon the training data (e.g., audio information and corresponding text information). Furthermore, obtaining representative training data of a particular domain may be expensive or technically challenging. For example, consider a speech processing system that is deployed in a known acoustic environment. A speech processing machine learning model trained with training data for that acoustic environment performs significantly better (e.g., in terms of speech processing accuracy) than other speech processing machine learning models trained with training data for different acoustic environments. As such, safeguarding training data from use in other machine learning models is an important aspect of developing and maintaining machine learning models.

There are various ways that training data may be impermissibly obtained. For example, training data may be obtained in a leak of private information. In another example, training data may be obtained through model inversion. Model inversion is a type of attack where an entity abuses access to a trained machine learning model in order to obtain the original training data. As shown in FIG. 1, a model inversion attack may be achieved using Generative Adversarial Networks (GANs) that are used to guide the training of a generator to reconstruct the distribution of the original training data of the Model Under Attack (MUA). In one example, suppose an individual or entity abuses access to a machine learning model and uses model inversion to generate a copy of the training data distribution. In this example, suppose that the individual or entity obtains the training data and uses this data to train their own machine learning model which they can market and sell as their proprietary system. In this example, suppose the "attacker" has little e.g., medical data and uses model inversion to obtain medical domain data distributions and enriches this with some of their own out-of-domain data to train a new machine learning system. As will be discussed in greater detail below, model inversion detection process 10 is able to detect and prevent such model inversion attacks by identifying anomalous patterns in requests for processing data with a trained machine learning model and determining that data of the anomalous patterns is converging with training data of the trained machine learning model.

Referring also to FIGS. 2-7, model inversion detection process 10 executes 200 a plurality of requests to process data using a trained machine learning model. An anomalous pattern of requests including at least a threshold amount of out-of-domain data is identified 202 from the plurality of requests. A potential model inversion attack is detected 204 based upon, at least in part, identifying the anomalous pattern of requests.

Figure 3:
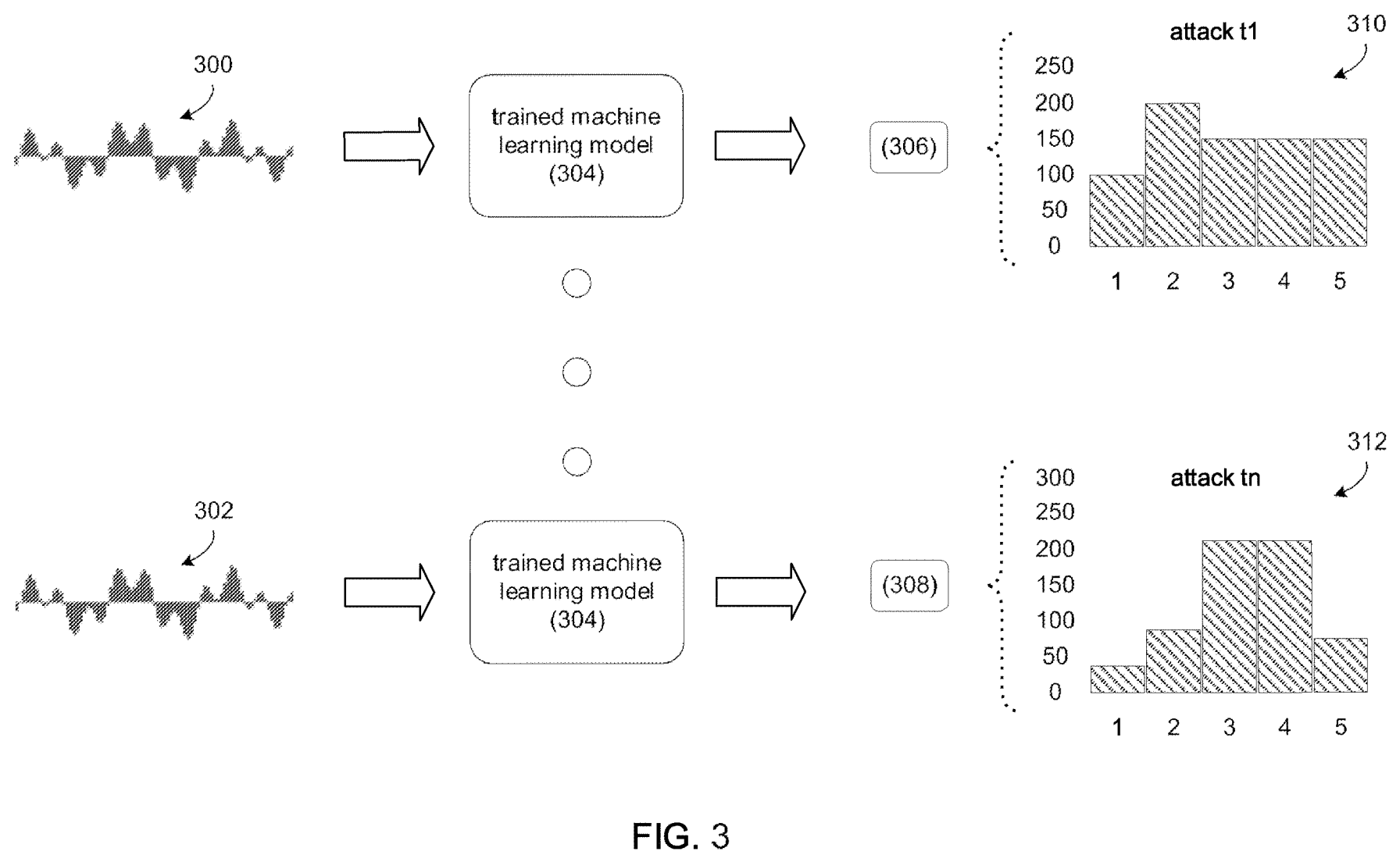

In some implementations, model inversion detection process 10 executes 200 a plurality of requests to process data using a trained machine learning model. Referring also to FIG. 3 and in one example, model inversion detection process 10 may receive a plurality of requests (e.g., requests 300, 302) to process data using a trained machine learning model (e.g., trained machine learning model 304). In some implementations, a request (e.g., request 300) includes data sent to a trained machine learning model (e.g., trained machine learning model 304) for processing. For example and in some implementations, the plurality of requests include a plurality of requests to process audio data using a trained speech processing machine learning model. In one example, trained machine learning model 304 is a trained machine learning model within or functioning as an automated speech recognition (ASR) system that processes audio data from request 300 to produce a textual representation of the audio data. In another example, trained machine learning model 304 is configured to process textual data and generate a speech representation of the textual data (i.e., a text-to-speech (TTS) system). As shown in FIG. 3, model inversion detection process 10 executes 200 a plurality of requests (e.g., requests 300, 302) over time. For example, model inversion detection process 10 processes request 300 with trained machine learning model 304 to generate output data (e.g., output data 306). Over time, model inversion detection process 10 executes 200 additional requests. For example, at another point in time, model inversion detection process 10 executes 200 request 302 with trained machine learning model 304 to generate output data (e.g., output data 308). As will be discussed in greater detail below, requests 300, 302 may be sent from the same actor in an anomalous pattern indicative of a model inversion attack such that the data (e.g., data within subsequent requests 300 and/or output data 306, 308) converges to training data associated with the trained machine learning model (e.g., trained machine learning model 304).

In some implementations, this data convergence includes convergence in the distribution of the data (e.g., distribution of data within subsequent requests 300 and/or output data 306, 308 and distribution of the training data). For example, suppose that an attacker desires to obtain the overall distribution of the training data. In this example, an attacker may continually provide additional requests to the trained machine learning model (e.g., trained machine learning model 304) until the overall distribution is ascertained. In another example, suppose an attacker desires only to match the distribution for a subset of the training data. In this example, an attacker may continually provide additional requests to the trained machine learning model (e.g., trained machine learning model 304) until the targeted distribution is ascertained. In each of these examples and any target amount of training data, model inversion detection process 10 is able to detect converge in the plurality of requests to the training data.

In some implementations, model inversion detection process 10 identifies 202 an anomalous pattern of requests from the plurality of requests including at least a threshold amount of out-of-domain data within the plurality of requests. An anomalous pattern of requests is a sequence or collection of requests that includes a particular request frequency, data similarity, source similarity, data distribution similarity, and/or data domain that extends beyond normal or expected patterns of requests or matches characteristics of known anomalous patterns of requests. In this manner, an anomalous pattern may be identified by either identifying a pattern of requests outside of expected bounds or by identifying a pattern that meets certain criteria indicative of an anomaly.

In some implementations, the identification of out-of-domain data is indicative of anomalous pattern of requests. Out-of-domain data is data that does not match the domain of the trained machine learning model or the domain of the data the trained machine learning model typically processes. For example, suppose that trained machine learning model 304 is trained to perform ASR on input speech data in order to generate a transcription of the input speech data. Further suppose that trained machine learning model 304 is trained using medical audio data and corresponding transcription data from a particular acoustic environment (e.g., a known doctor's office or a known examination room using known audio recording equipment). In this example, the domain of the training data for trained machine learning model 304 is medical data from the particular acoustic environment.

Now suppose that model inversion detection process 10 processes 200 requests 300, 302 for a particular user. In this example, suppose that request 300 includes audio data that is not associated with the medical domain. For example, suppose that request 300 includes audio data corresponding to a conversation between participants of a conference call in a conference room with particular audio recording equipment that is different from the known audio recording equipment of the medical data domain. In some implementations, when executing 200 the plurality of requests (e.g., requests 300, 302), model inversion detection process 10 compares the domain characteristics (e.g., content of the data (e.g., particular words corresponding to domain); and/or acoustic features of the data (e.g., reverberation, noise, etc.)) of the data from the requests (e.g., requests 300, 302) to the domain characteristics of the training data to determine whether or not the data of the requests (e.g., requests 300, 302) include at least a threshold amount of out-of-domain data. In some implementations, the threshold amount of out-of-domain data is a user-defined amount, a default amount, and/or dynamically determined by model inversion detection process 10. In some implementations and in response to determining that the data of the plurality of requests (e.g., requests 300, 302) include at least the threshold amount of out-of-domain data, model inversion detection process 10 identifies 202 an anomalous pattern of requests from the plurality of requests.

In some implementations, model inversion detection process 10 identifies an anomalous pattern of requests from other irregular request traffic in addition to or instead of the threshold amount of out-of-domain data. In one example, an anomalous pattern of requests is identified when at least a threshold number of requests are received from the same source within a predefined period of time. For example, suppose request 300 includes a request to process audio data (e.g., audio encounter information concerning a patient's visit with a medical professional). Further suppose that model inversion detection process 10 processes several additional requests, including request 302, from the same source to process similar audio data (e.g., audio encounter information concerning the same patient visiting with the same medical professional) and is received within a predefined period of time (e.g., within 24 hours) of request 300. In this example, model inversion detection process 10 identifies 202 an anomalous pattern of requests (e.g., requests 300, 302) based upon, at least in part, the source of the requests, the data of the requests (e.g., the same speakers), and/or the frequency of the requests relative to one another.

For example, suppose requests 300, 302 include 48 hours' worth of audio data between the patient and the medical professional. In this example, because it is seemingly impossible to generate 48 hours' worth of audio data within 24 hours, this is an anomalous pattern of requests. In another example, a steady stream of requests is received over a 24 hour period, not showing the usual dependence on working hours. The number of processing requests from a legitimate source should dip during the relative "early morning" hours and/or "late evening" hours. As these period of time are different in various parts of the world, model inversion detection process may monitor over several 24 hour periods. In some implementations and as will be discussed in greater detail below, model inversion detection process 10 dynamically determines which characteristics in the pattern of requests identify an anomalous pattern by processing request traffic information and request distribution similarity information using a machine learning model.

In another example, model inversion detection process 10 identifies an anomalous pattern of requests when the requests are very similar to one another. For example, an attacker may generate many patterns with small variations from a base pattern to invert aspects of the trained machine learning model. In some implementations, model inversion detection process 10 compares a plurality of requests from the same source over time to determine if there is a threshold level of similarity. For example, model inversion detection process 10 uses a user-defined threshold level of similarity for identifying sufficiently similar requests to identify an anomalous pattern of requests.

In some implementations, identifying 202 an anomalous pattern of requests from the plurality of requests includes comparing a distribution of data from each of the plurality of requests with a known or multiple known attack signatures. For example, model inversion detection process 10 accesses a database of known attack signatures in the plurality of requests and compares the plurality of requests with the known attack signature(s). Model inversion detection process 10 identifies 202 the plurality of requests as an anomalous pattern when the plurality of requests are within a predefined threshold level of similarity of a known attack signature. In this manner, model inversion detection process 10 uses a pattern of a known attack to detect a potential model inversion attack on the trained machine learning model.

Figure 4:
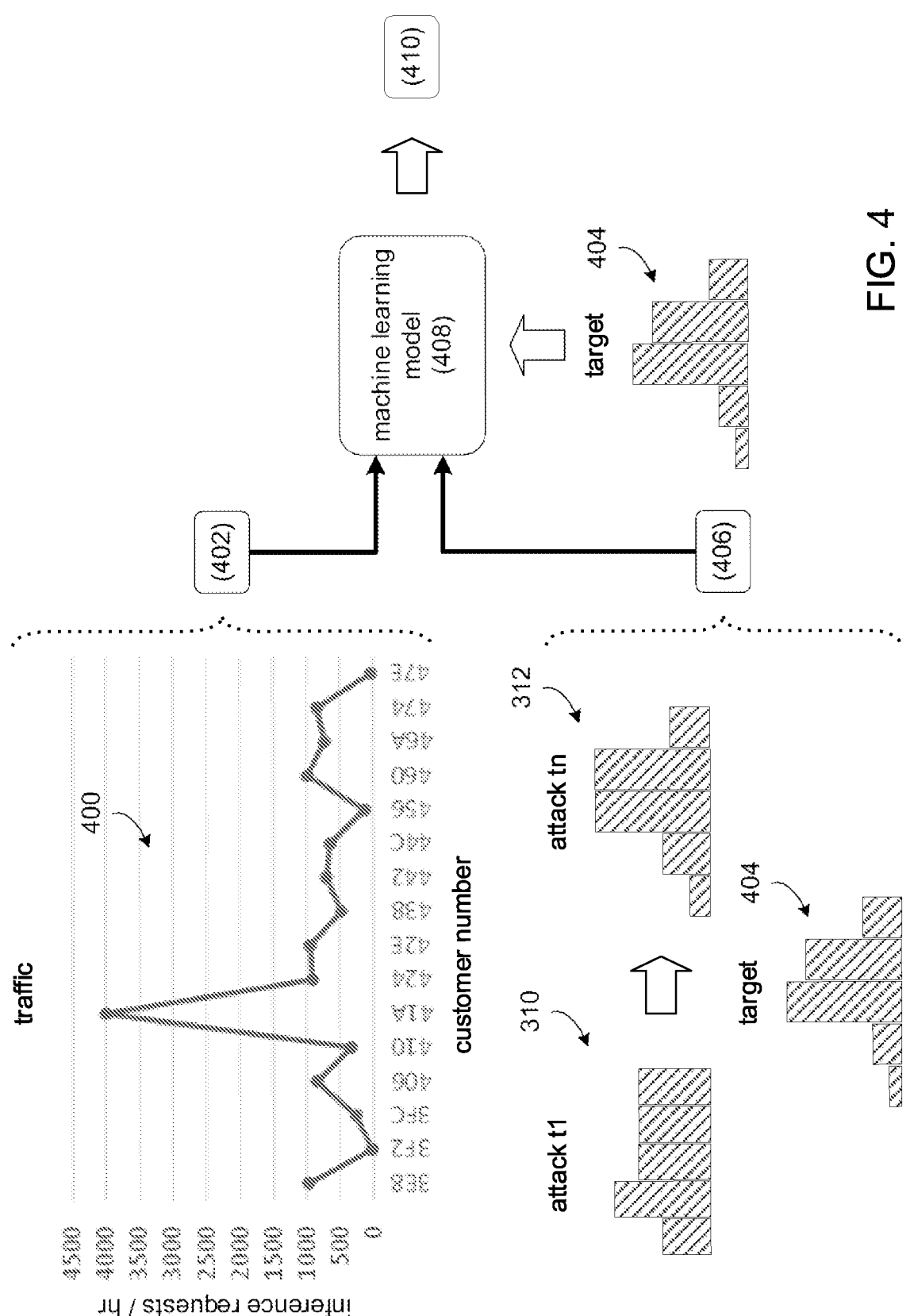

In some implementations, identifying 202 the anomalous pattern of requests from the plurality of requests includes generating 206 request traffic information based upon, at least in part, the plurality of requests to process data using the training machine learning model. Request traffic information is information concerning the traffic (i.e., frequency and history) of requests processed for a particular user or source. For example, suppose model inversion detection process 10 processes a plurality of requests (e.g., requests 300, 302 and any number of requests between request 300 and request 302). In this example, model inversion detection process 10 generates 206 request traffic information by monitoring and recording a number of process requests over a particular window of time. Referring also to FIG. 4, model inversion detection process 10 generates 206 request traffic information (e.g., request traffic information 400) by monitoring and recording a number of process requests e.g., per hour for each user. In this example, request traffic information 400 shows a significantly higher amount of request traffic coming from one particular user relative to the other users of trained machine learning model 304.

In some implementations, generating 206 the request traffic information includes generating a request traffic profile vector. A request traffic profile vector is a numerical representation of the request traffic information that is processed by a machine learning model. In some implementations, the machine learning model is able to account for various types of trained machine learning models and/or shifts in regular or normal request patterns for a particular trained machine learning model. Generating the request traffic profile vector (e.g., request traffic profile vector 402) includes converting the request traffic information (e.g., request traffic information 400) into a vector of values indicating the number of requests processed for each user over a particular window of time. In some implementations, model inversion detection process 10 generates the request traffic profile vector on demand (e.g., when requested by a user) and/or periodically (e.g., updated each second, minute, hour, day, etc.). In this manner, model inversion detection process 10 uses the request traffic profile vector (e.g., request traffic profiled vector 402) to represent the request traffic from a particular user of the trained machined learning model (e.g., trained machine learning model 304).

In some implementations, identifying 202 the anomalous pattern of requests from the plurality of requests includes comparing 208 the anomalous pattern of requests to training data associated with the trained machine learning model. For example, when model inversion detection process 10 identifies 202 an anomalous pattern of requests, this identified pattern may not, on its own, indicate the presence of a model inversion attack. As discussed above, model inversion attacks seek to replicate the training data/the distribution of particular characteristics of the training data in order to train machine learning models to function similarly to the trained machine learning model. Accordingly, model inversion detection process 10 compares 208 the anomalous pattern of requests to training data associated with the trained machine learning model in order to determine whether or not the data of the anomalous pattern of requests and the training data are converging (i.e., the distribution of the data of the anomalous pattern of requests is converging to the distribution of the training data).

In some implementations, comparing 208 the anomalous pattern of requests to the training data includes generating 210 request distribution similarity information based upon, at least in part, a similarity in a plurality of distributions of the anomalous pattern of requests relative to the training data over time. Request distribution similarity information is information concerning the similarity in the distribution of particular characteristics or features of the data processed by the trained machine learning model and/or the resulting data generated by the trained machine learning model relative to corresponding characteristics or features of the training data. For example, suppose model inversion detection process 10 processes a plurality of requests (e.g., requests 300, 302 and any number of requests between request 300 and request 302) to generate output data (e.g., output data 306 corresponding to request 300 and output data 308 corresponding to request 302). In this example, model inversion detection process 10 generates 210 request distribution similarity information by determining the distribution of particular features within the data of requests 300, 302 and/or output data 306, 308 (e.g., request distribution information 310, 312) and comparing request distribution information 310, 312 to the distribution of these same features within the training data (e.g., training data distribution information 404).

In some implementations, generating 210 the request distribution similarity information includes generating a request distribution similarity vector. A request distribution similarity vector is a numerical representation of the similarity between the request distribution information and the training data distribution information that can be processed by a machine learning model. Generating the request distribution similarity vector (e.g., request distribution similarity vector 406) includes generating a similarity metric for the features of the request distribution information and the training data distribution information. For example, suppose request distribution information 310, 312 and training data distribution information 404 include a distribution of two features (e.g., a distribution of Mel Filter-bank Coefficients, a distribution of particular words in the output of an ASR system, etc.). In this example, model inversion detection process 10 generates request distribution similarity vector 406 by comparing the differences in distributions for each feature in the request distribution information (e.g., request distribution information 310, 312) and the training data distribution information (e.g., training data distribution information 404) and generating a numerical value representing this difference.

In some implementations, model inversion detection process 10 detects 204 a potential model inversion attack based upon at least in part, identifying the anomalous pattern of requests from the plurality of requests. For example, detecting 204 a potential model inversion attack includes performing 212 a remedial action when a potential model inversion attack is detected. In some implementations and as will be described in greater detail below, remedial actions in the context of a model inversion attack include: executing subsequent requests associated with a potential model inversion attack with one or more decoy machine learning models based upon, at least in part, the model inversion confidence score; blocking or slowing subsequent requests associated with the potential model inversion attack; providing a notification or alert to various individuals or entities for resolution; and/or generating a report indicating the detection of a potential model inversion attack. In this manner, model inversion detection process 10 can perform 212 various remedial actions to either further monitor the occurrence of a model inversion attack, or to prevent a model inversion attack.

In some implementations, detecting 204 the potential model inversion attack includes identifying 214 convergence in the anomalous pattern of requests and the training data. Convergence in the anomalous pattern of requests and the training data is the iterative changing or modifying of the data of the anomalous pattern of requests from an original form to a form that becomes identical or substantially similar to the form of the training data used to train the trained machine learning model over time. For example, in a model inversion attack, an attacker that has access to a trained machine learning model provides numerous requests to process data using the trained machine learning model. With each subsequent request, the attack provides data based upon the latest output data from the trained machine learning model. In this manner, with each successive execution by the trained machine learning model, the data of the anomalous pattern of requests converges to the training data.

Figure 5:
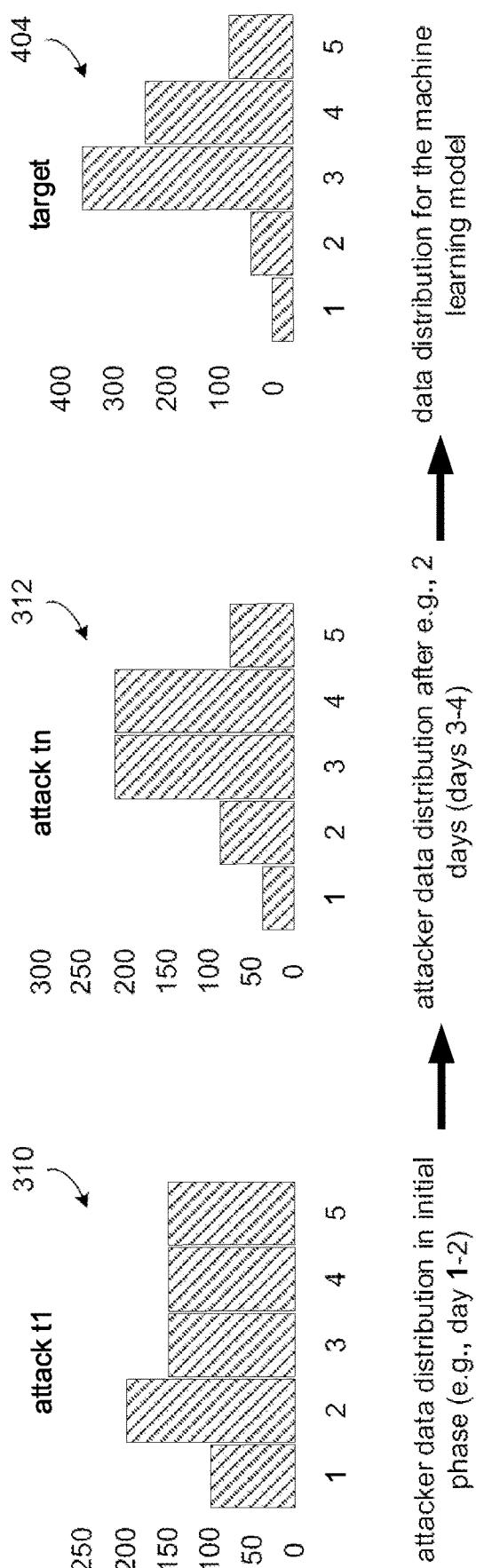

Referring also to FIG. 5, suppose a first request (e.g., request 300) requests execution by a trained machine learning model (e.g., trained machine learning model 304) to generate output data 306 which has a distribution of particular features (e.g., request distribution information 310). After a number of successive, intervening requests to process data using trained machine learning model 304, suppose that model inversion detection process 10 processes request 302 and generates output data 308 which has a different distribution of the particular features (e.g., request distribution information 312). As shown in FIG. 5, this change in request distribution information (e.g., from request distribution information 310 to request distribution information 312) when compared to training data distribution information 404, shows a notable convergence to the training data.

In some implementations, detecting 204 the potential model inversion attack includes generating 216 a model inversion confidence score by processing the request distribution similarity information and the request traffic information with a machine learning model. A model inversion confidence score is a value (e.g., ranging from "0" to "1", where "0" is indicative of the lowest confidence that a model inversion attack is occurring and "1" is indicative of the highest confidence that a model inversion attack is occurring) indicating a probability that an anomalous pattern of requests being processed by the trained machine learning model is a model inversion attack. Referring again to FIG. 4 and in some implementations, model inversion detection process 10 uses a machine learning model (e.g., machine learning model 408) to generate a model inversion confidence score (e.g., model inversion confidence score 410) by processing the request traffic information (e.g., request traffic profile vector 402); the request distribution similarity information (e.g., request distribution similarity vector 406); and the training data distribution information (e.g., training data distribution information 404).

In some implementations, model inversion detection process 10 trains machine learning model 408 with training data in the form of request traffic profile vectors; request distribution similarity vectors; training data distribution information; and model inversion confidence scores to generate model inversion confidence scores that accurately identify when a model inversion attack is occurring and when a model inversion attack is not occurring. In one example, model inversion detection process 10 trains machine learning model 408 by simulating a model inversion attack on a trained machine learning model to generate a request traffic profile vector and a request distribution similarity vector corresponding to the occurrence of a known model inversion attack. In another example, model inversion detection process 10 trains machine learning model 408 by simulating the absence of a model inversion attack on a trained machine learning model to generate a request traffic profile vector and a request distribution similarity vector corresponding to the absence of a known model inversion attack.

In some implementations, with a model inversion confidence score, model inversion detection process 10 may perform 212 a remedial action when a potential model inversion attack is detected. In some implementations and as will be described in greater detail below, remedial actions in the context of a model inversion attack include: executing subsequent requests associated with a potential model inversion attack with one or more decoy machine learning models based upon, at least in part, the model inversion confidence score; blocking or slowing subsequent requests associated with the potential model inversion attack; providing a notification or alert to various individuals or entities for resolution; and/or generating a report indicating the detection of a potential model inversion attack. In one example, suppose that model inversion detection process 10 executes 200 a plurality of requests (e.g., requests 300, 302) for processing audio data using a trained speech processing machine learning model (e.g., trained machine learning model 304). Suppose that model inversion detection process 10 generates a request traffic profile vector (e.g., request traffic profile vector 402) and generates a request distribution similarity vector (e.g., request distribution similarity vector 406) based upon, at least in part, the execution of requests 300, 302. In this example, model inversion detection process 10 processes request traffic profile vector 402 and request distribution similarity vector 406 using a machine learning model (e.g., machine learning model 408) to generate a model inversion confidence score (e.g., model inversion confidence score 410).

In some implementations and as will be discussed in greater detail below, model inversion detection process 10 compares model inversion confidence score 410 to one or more thresholds to perform 212 a remedial action. For example and in some implementations, based on the value of model inversion confidence score 410, model inversion detection process 10 performs 212 more restrictive remedial actions for higher model inversion confidence scores (e.g., blocking or stopping subsequent requests) and less restrictive, more observational remedial actions for lower model inversion confidence scores (e.g., executing subsequent requests with a decoy machine learning model to further assess the nature of the subsequent requests). In this manner, model inversion detection process 10 performs 212 various remedial actions to protect the trained machine learning model from a potential model inversion attack using the model inversion confidence score.

In some implementations, model inversion detection process 10 processes 218 a plurality of requests to process data using the trained machine learning model on a decoy machine learning model. A decoy machine learning model is a machine learning model trained with less sensitive data relative to the trained machine learning model such that the performance aspects and/or the amount of sensitive information available are reduced. In some implementations, the decoy machine learning model is used to further observe and assess the plurality of requests to determine whether or not they constitute a model inversion attack. In one example, the decoy machine learning model includes out-of-domain data that allows an attacker to more quickly converge to the training data of the decoy machine learning model. In this example, the accelerated converging helps to identify a model inversion attack more efficiently as the time required to converge out-of-domain data to the training data of an actual trained machine learning model is much greater than the time required to converge to the training data of the decoy machine learning model.

In another example, the decoy machine learning model is adapted in response to identifying the anomalous pattern of requests by using at least a portion of the request data in the decoy machine learning model. For example, by incorporating data from the plurality of requests within the decoy machine learning model, the plurality of requests are more likely to converge (i.e., the data or distribution of the data within the plurality of requests) to the training data of the decoy machine learning model. In some implementations, model inversion detection process 10 adapts the trained machine learning model (or a copy of the trained machine learning model) to the data within the plurality of requests to generate the decoy machine learning model. In this manner, model inversion detection process 10 provides the user better (i.e., higher accuracy) results for their data while preventing convergence (i.e., the inversion) to the trained machine learning model data by converging more quickly to the "attacker" data than the attacker can converge their data to the trained machine learning model.

In some implementations, the decoy machine learning model may include watermarked features to detect a machine learning model that uses the output data of the decoy machine learning model as training data. For example, suppose model inversion detection process 10 executes 218 a plurality of requests using a decoy machine learning model that includes watermarked features. In this example, as the decoy machine learning model generates output data, the output data includes the watermarked features. Now suppose that the output data from the decoy machine learning model is used to train another machine learning model (e.g., a suspect machine learning model). In this example, by processing particular input data with the suspect machine learning model, the watermarked features are identifiable in the output data of the suspect machine learning model.

Figure 6:
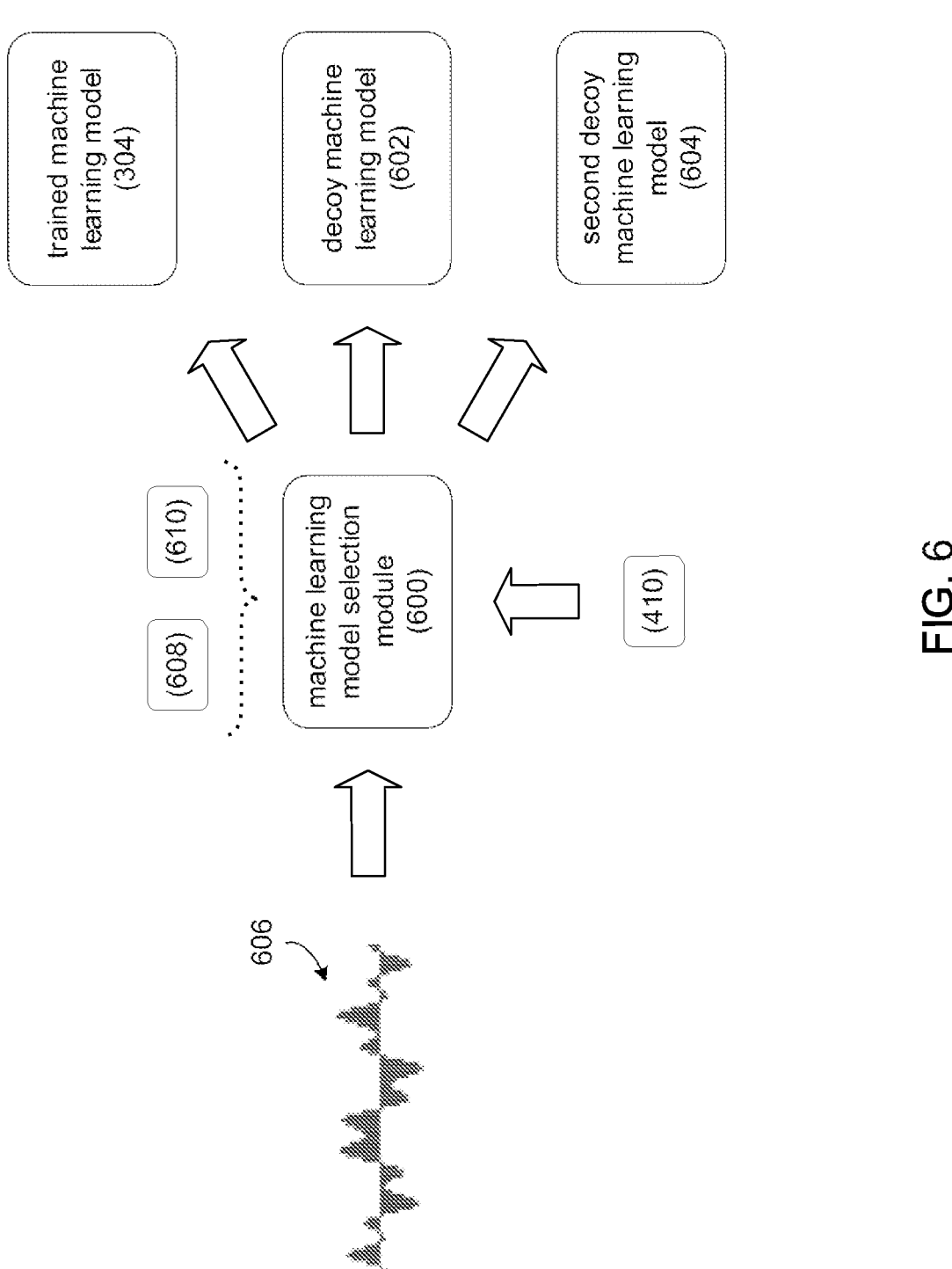

In some implementations, model inversion detection process 10 uses the model inversion confidence score to select a particular machine learning model to process requests with. Referring also to FIG. 6 and in some implementations, suppose model inversion detection process 10 detects 206 a potential model inversion attack (in the manner discussed above) on trained machine learning model 304. In this example, model inversion detection process 10 uses model inversion confidence score 410 and a machine learning model selection module (e.g., machine learning model selection module 600) to select a particular machine learning model (e.g., trained machine learning model 304; decoy machine learning model 602; or second machine learning model 604) when executing a request (e.g., request 606). In some implementations, machine learning model selection module 600 is a software and/or hardware module configured to compare model inversion confidence score 410 to select a particular machine learning model to process requests (e.g., request 606). As will be discussed in greater detail below and in some implementations, machine learning model selection module 600 includes various thresholds for determining which machine learning model to use.

In some implementations, executing 218 the plurality of requests to process data using the trained machine learning model on the decoy machine learning model includes determining 220 whether the model inversion confidence score exceeds a first threshold but does not exceed a second threshold; and, in response to determining that the model inversion confidence score exceeds the first threshold but does not exceed the second threshold, processing 222 the plurality of requests using the decoy machine learning model. In some implementations, machine learning model selection module 600 includes at least one threshold (e.g., first threshold 608 and second threshold 610). For example, first threshold 608 is a confidence value threshold that determines whether the risk of a model inversion attack is sufficiently high as to process 222 subsequent requests (e.g., request 600) with a decoy machine learning model (e.g., decoy machine learning model 602). In some implementations, decoy machine learning model 602 is configured to "leak" a minimum amount of sensitive data, while providing reasonable data processing performance (e.g., ASR performance in the context of a trained ASR machine learning model) when executing subsequent requests from a potential attacker.

In some implementations, model inversion detection process 10 determines 220 that model inversion confidence score 410 exceeds first threshold 608 but does not exceed second threshold 610. When model inversion confidence score 410 exceeds first threshold 608, model inversion detection process 10 determines that there is a sufficient risk of a model inversion attack to warrant some protection and further observation. For example, when model inversion confidence score 410 exceeds first threshold 608 but does not exceed second threshold 610, model inversion detection process 10 determines that there is a possibility that the user is not performing a model inversion attack. Accordingly, model inversion detection process 10 processes 222 the plurality of requests (e.g., request 600) using decoy machine learning model 602 until the model inversion confidence score drops below first threshold 608 or exceeds second threshold 610. In this manner, decoy machine learning model 602 allows model inversion detection process 10 to collect additional data to become more confident. In some implementations, processing 222 the plurality of requests using decoy machine learning model 602 includes reducing the processing speed of the machine learning model (e.g., decoy machine learning model 602) to limit model inversion and to allow for more observation of the potential model inversion attack on decoy machine learning model 602. As will be discussed in greater detail below, model inversion detection process 10 monitors for convergence in the plurality of requests and training data associated with the decoy machine learning model.

In some implementations, executing 218 the plurality of requests to process data using the trained machine learning model on the decoy machine learning model includes: determining 224 whether the model inversion confidence score exceeds the second threshold; and, in response to determining that the model inversion confidence score exceeds the second threshold, processing 226 the plurality of requests using a second decoy machine learning model. For example, suppose model inversion confidence score 410 exceeds both first threshold 608 and second threshold 610. In this example, model inversion detection process 10 determines 224 that model inversion confidence score 410 exceeds second threshold 610. Accordingly, model inversion detection process 10 processes the plurality of requests (e.g., subsequent request 606) using a second decoy machine learning model (e.g., second decoy machine learning model 604). Second decoy machine learning model 604 generally includes a small trained machine learning model that is configured to deliberately "lure" an attacker to fully adapt their model inversion attack on second decoy machine learning model 604, allowing model inversion detection process 10 to prove that someone is performing a model inversion attack on trained machine learning model 304.

In some implementations, model inversion detection process 10 monitors 228 for convergence in the plurality of requests and training data associated with the decoy machine learning model. For example, when convergence is identified in the plurality of requests and the training data associated with the decoy machine learning model, model inversion detection process 10 performs 212 a remedial action. In one example, suppose that model inversion detection process 10 determines 220 that model inversion confidence score 410 exceeds first threshold 608 but does not exceed second threshold 610 and processes 222 request 606 using decoy machine learning model 602. In this example, suppose that model inversion detection process 10 monitors 228 for, and identifies, convergence in the plurality of requests and training data associated with decoy machine learning model 602. Accordingly, model inversion detection process 10 performs 212 a remedial action in response to identifying convergence in the plurality of requests and training data associated with decoy machine learning model 602. In one example, model inversion detection process 10 blocks or slows subsequent requests associated with the potential model inversion attack as a remedial action. In another example, model inversion detection process 10 provides a notification or alert to various individuals or entities for resolution. In another example, model inversion detection process 10 generates a report indicating the detection of a potential model inversion attack. Accordingly, model inversion detection process 10 performs 212 a remedial action in response to determining that the plurality of requests and training data associated with decoy machine learning model 602 converge.

Figure 7:
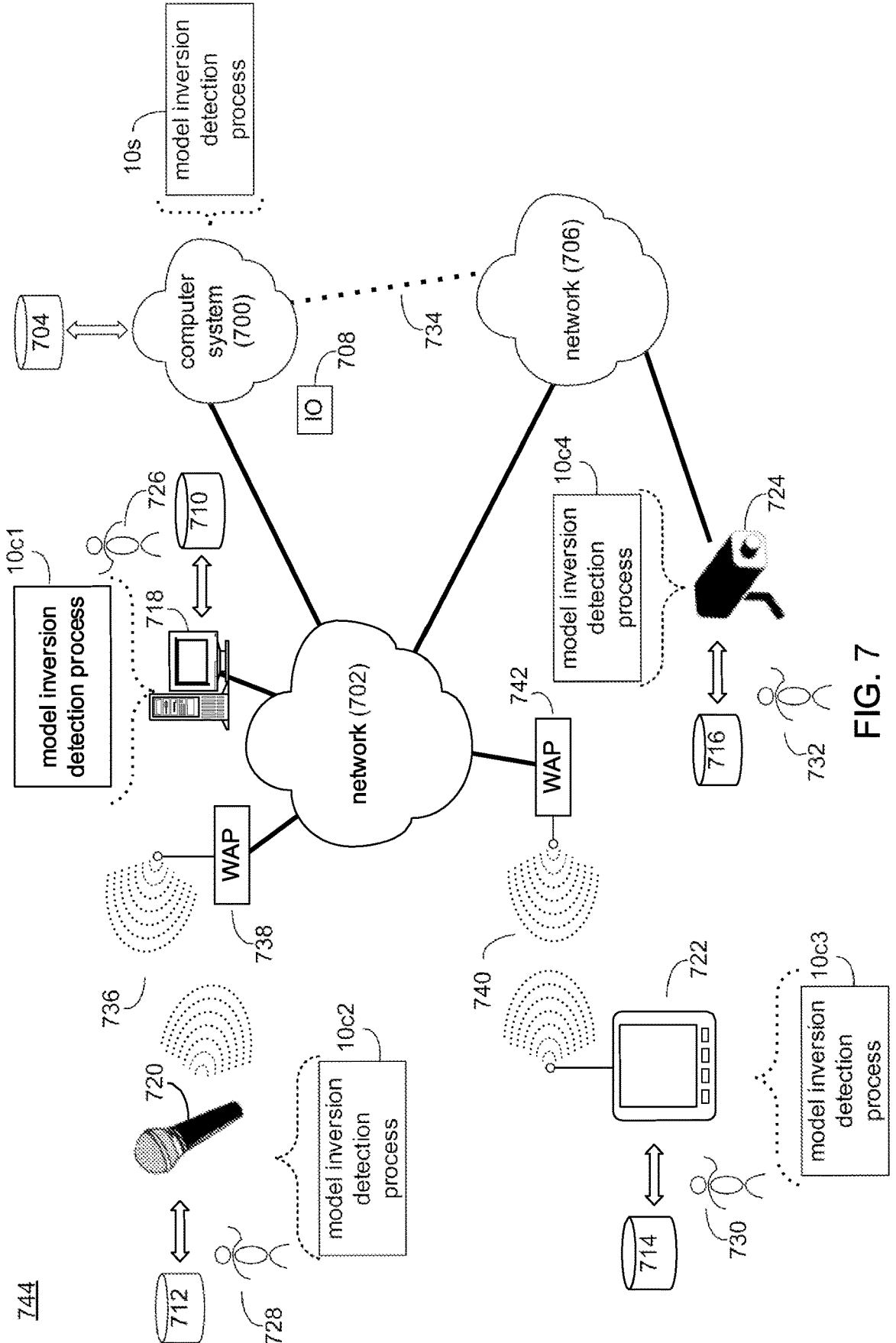
FIG. 7 is a diagrammatic view of a computer system and a model inversion detection process coupled to a distributed computing network.

System Overview:

Referring to FIG. 7, there is shown model inversion detection process 10. Model inversion detection process 10 may be implemented as a server-side process, a client-side process, or a hybrid server-side/client-side process. For example, model inversion detection process 10 may be implemented as a purely server-side process via model inversion detection process 10s. Alternatively, model inversion detection process 10 may be implemented as a purely client-side process via one or more of model inversion detection process 10cl, model inversion detection process 10c2, model inversion detection process 10c3, and model inversion detection process 10c4. Alternatively still, model inversion detection process 10 may be implemented as a hybrid server-side/client-side process via model inversion detection process 10s in combination with one or more of model inversion detection process 10cl, model inversion detection process 10c2, model inversion detection process 10c3, and model inversion detection process 10c4.

Accordingly, model inversion detection process 10 as used in this disclosure may include any combination of model inversion detection process 10s, model inversion detection process 10cl, model inversion detection process 10c2, model inversion detection process 10c3, and model inversion detection process 10c4.

Model inversion detection process 10s may be a server application and may reside on and may be executed by a computer system 700, which may be connected to network 702 (e.g., the Internet or a local area network). Computer system 700 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

A SAN includes one or more of a personal computer, a server computer, a series of server computers, a mini computer, a mainframe computer, a RAID device and a NAS system. The various components of computer system 700 may execute one or more operating systems.

The instruction sets and subroutines of model inversion detection process 10s, which may be stored on storage device 704 coupled to computer system 700, may be executed by one or more processors (not shown) and one or more memory architectures (not shown) included within computer system 700. Examples of storage device 704 may include but are not limited to: a hard disk drive; a RAID device; a random access memory (RAM); a read-only memory (ROM); and all forms of flash memory storage devices.

Network 702 may be connected to one or more secondary networks (e.g., network 704), examples of which may include but are not limited to: a local area network; a wide area network; or an intranet, for example.

Various IO requests (e.g., IO request 708) may be sent from model inversion detection process 10s, model inversion detection process 10cl, model inversion detection process 10c2, model inversion detection process 10c3 and/or model inversion detection process 10c4 to computer system

700. Examples of IO request 708 may include but are not limited to data write requests (i.e., a request that content be written to computer system 700) and data read requests (i.e., a request that content be read from computer system 700).

The instruction sets and subroutines of model inversion detection process 10cl, model inversion detection process 10c2, model inversion detection process 10c3 and/or model inversion detection process 10c4, which may be stored on storage devices 710, 712, 714, 716 (respectively) coupled to client electronic devices 718, 720, 722, 724 (respectively), may be executed by one or more processors (not shown) and one or more memory architectures (not shown) incorporated into client electronic devices 718, 720, 722, 724 (respectively). Storage devices 710, 712, 714, 716 may include but are not limited to: hard disk drives; optical drives; RAID devices; random access memories (RAM); read-only memories (ROM), and all forms of flash memory storage devices. Examples of client electronic devices 718, 720, 722, 724 may include, but are not limited to, personal computing device 718 (e.g., a smart phone, a personal digital assistant, a laptop computer, a notebook computer, and a desktop computer), audio input device 720 (e.g., a handheld microphone, a lapel microphone, an embedded microphone (such as those embedded within eyeglasses, smart phones, tablet computers and/or watches) and an audio recording device), display device 722 (e.g., a tablet computer, a computer monitor, and a smart television), machine vision input device 724 (e.g., an RGB imaging system, an infrared imaging system, an ultraviolet imaging system, a laser imaging system, a SONAR imaging system, a RADAR imaging system, and a thermal imaging system), a hybrid device (e.g., a single device that includes the functionality of one or more of the above-references devices; not shown), an audio rendering device (e.g., a speaker system, a headphone system, or an earbud system; not shown), various medical devices (e.g., medical imaging equipment, heart monitoring machines, body weight scales, body temperature thermometers, and blood pressure machines; not shown), and a dedicated network device (not shown).

Users 726, 728, 730, 732 may access computer system 700 directly through network 702 or through secondary network 706. Further, computer system 700 may be connected to network 702 through secondary network 706, as illustrated with link line 734.

The various client electronic devices (e.g., client electronic devices 718, 720, 722, 724) may be directly or indirectly coupled to network 702 (or network 706). For example, personal computing device 718 is shown directly coupled to network 702 via a hardwired network connection. Further, machine vision input device 724 is shown directly coupled to network 706 via a hardwired network connection. Audio input device 722 is shown wirelessly coupled to network 702 via wireless communication channel 736 established between audio input device 720 and wireless access point (i.e., WAP) 738, which is shown directly coupled to network 702. WAP 736 may be, for example, an IEEE 802.11a, 802.11b, 802.11g, 802.11n, Wi-Fi, and/or Bluetooth™ device that is capable of establishing wireless communication channel 736 between audio input device 720 and WAP 738. Display device 722 is shown wirelessly coupled to network 702 via wireless communication channel 740 established between display device 722 and WAP 742, which is shown directly coupled to network 702.

The various client electronic devices (e.g., client electronic devices 718, 720, 722, 724) may each execute an operating system, wherein the combination of the various client electronic devices (e.g., client electronic devices 718, 720, 722, 724) and computer system 700 may form modular system 744.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computing system comprising:

a memory storing programming instructions; and a processor configured to execute the programming instructions stored by the memory, wherein the programming instructions, upon execution by the processor, cause the computing system to:

receive a plurality of requests to process data using a trained machine learning model;

generate a model inversion confidence score based on the plurality of requests;

determine that the model inversion confidence score exceeds a first threshold;

process the plurality of requests using a decoy machine learning model in response to determining that the model inversion confidence score exceeds the first threshold; and detect a potential model inversion attack on the trained machine learning model by identifying convergence in the plurality of requests and training data associated with the decoy machine learning model.

2. The computing system of claim 1, wherein the programming instructions further cause the computing system to identify, within the plurality of requests, an anomalous pattern of requests, the potential model inversion attack being detected based on the anomalous pattern of requests.

3. The computing system of claim 2, wherein identifying the anomalous pattern of requests includes:

generating request traffic information based upon, at least in part, the plurality of requests; and generating request distribution similarity information based upon, at least in part, a similarity in a plurality of distributions of the anomalous pattern of requests over time.

4. The computing system of claim 3, wherein the model inversion confidence score is generated by processing the request distribution similarity information and the request traffic information with a machine learning model.

5. A computer program product residing on a non-transitory computer readable medium having a plurality of instructions stored thereon which, when executed by a processor, cause the processor to perform operations comprising:

receiving a plurality of requests to process data using a trained machine learning model;

identifying, within the plurality of requests, an anomalous pattern of requests;

generating a model inversion confidence score by comparing the anomalous pattern of requests to training data associated with the trained machine learning model;

determining that the model inversion confidence score exceeds a first threshold;

processing the plurality of requests using a decoy machine learning model in response to determining that the model inversion confidence score exceeds the first threshold; and detecting a potential model inversion attack by identifying convergence in the anomalous pattern of requests and the training data.

6. The computer program product of claim 5, wherein the plurality of requests include requests to process audio data using a trained speech processing machine learning model.

7. The computer program product of claim 5, wherein identifying the anomalous pattern of requests includes:

generating request traffic information based upon, at least in part, the plurality of requests; and generating request distribution similarity information based upon, at least in part, a similarity in a plurality of distributions of the anomalous pattern of requests relative to the training data over time.

8. The computer program product of claim 7, wherein the model inversion confidence score is generated by processing the request distribution similarity information and the request traffic information with a machine learning model.

9. A method comprising:

receiving a plurality of requests to process data using a trained machine learning model;

identifying, within the plurality of requests, an anomalous pattern of requests;

generating a model inversion confidence score by comparing the anomalous pattern of requests to training data associated with the trained machine learning model;

determining that the model inversion confidence score exceeds a first threshold;

processing the plurality of requests using a decoy machine learning model in response to determining that the model inversion confidence score exceeds the first threshold; and detecting a potential model inversion attack by identifying convergence in the anomalous pattern of requests and the training data.

10. The method of claim 9, wherein the plurality of requests include requests to process audio data using a trained speech processing machine learning model.

11. The method of claim 9, wherein identifying the anomalous pattern of requests includes:

generating request traffic information based upon, at least in part, the plurality of requests; and generating request distribution similarity information based upon, at least in part, a similarity in a plurality of distributions of the anomalous pattern of requests relative to the training data over time.

12. The method of claim 11, wherein the model inversion confidence score is generated by processing the request distribution similarity information and the request traffic information with a machine learning model.

13. The method of claim 11, wherein identifying convergence in the anomalous pattern of requests and the training data comprises identifying convergence in a distribution of data within the plurality of requests and a distribution of the training data such that the distribution of the data within the plurality of requests becomes more similar to the distribution of the training data over time.

14. The method of claim 11, wherein identifying convergence in the anomalous pattern of requests and the training data comprises identifying an iterative changing or modifying of the data in the plurality of requests such that a form of the data in the plurality of requests becomes more similar to a form of the training data over time.

15. The method of claim 11, wherein the model inversion confidence score indicates a probability that the anomalous pattern of requests is the model inversion attack.

16. The method of claim 11, further comprising:

blocking, in response to detecting the potential model inversion attack, subsequent requests from a source of the plurality of requests from being processed by the trained machine learning model.

17. The method of claim 11, wherein the decoy machine learning model is trained with less sensitive training data than the trained machine learning model such that the decoy machine learning model outputs a lower amount of sensitive data in response to model inversion attacks than the trained machine learning model.

18. The method of claim 11, wherein identifying the anomalous pattern of requests comprises detecting out-of-domain data within the plurality of requests that does not match a domain of the trained machine learning model.

19. The method of claim 18, wherein the domain of the trained machine learning model comprises a medical domain, and wherein the out-of-domain data includes audio data that is not associated with the medical domain.

20. The method of claim 18, wherein the domain of the trained machine learning model comprises a particular acoustic environment, and wherein the out-of-domain data includes audio data with acoustic features that mismatch the particular acoustic environment.

* * * * *